US012755224B2

(12) United States Patent
Zhou et al.

(10) Patent No.: US 12,755,224 B2
(45) Date of Patent: Oct. 6, 2026

(54) SYSTEMS AND METHODS FOR MODELING A DEPLOYMENT OF HETEROGENEOUS MEMORY ON A SERVER NETWORK

(71) Applicant: Lemon Inc., Grand Cayman (KY)

(72) Inventors: Ping Zhou, Los Angeles, CA (US); Jiaxin Shan, Los Angeles, CA (US); Wenhui Zhang, Los Angeles, CA (US); Fei Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 236 days.

(21) Appl. No.: 18/525,580

(22) Filed: Nov. 30, 2023

(65) Prior Publication Data

US 2024/0135282 A1 Apr. 25, 2024

(51) Int. Cl.
*G06Q 10/06* (2023.01)
*G06Q 10/0631* (2023.01)
*G06Q 10/067* (2023.01)

(52) U.S. Cl.
CPC ..... *G06Q 10/06313* (2013.01); *G06Q 10/067* (2013.01)

(58) Field of Classification Search
CPC ...................................................... G06Q 10/06
See application file for complete search history.

(56) References Cited

U.S. PATENT DOCUMENTS 10,678,764 B2 * 6/2020 Liu ......................... G06F 16/22
2016/0328273 A1 * 11/2016 Molka ...................... A61B 8/00
2020/0264936 A1 * 8/2020 Gurram ................. G06F 9/5044
2021/0216320 A1 * 7/2021 Espy ..................... G06F 12/109
2022/0076726 A1 * 3/2022 Hulton .................. G06F 11/076
2023/0068386 A1 * 3/2023 Akdeniz ................ G06N 3/084
2025/0138883 A1 * 5/2025 Stabrawa ............. G06F 9/5044

FOREIGN PATENT DOCUMENTS

EP 3503473 A1 * 6/2019 ............. H04L 43/16
WO WO-2018219183 A1 * 12/2018 ........... G06F 9/5083

OTHER PUBLICATIONS

Li, H. et al., "First-generation Memory Disaggregation for Cloud Platforms," arXiv:2203.00241v1, Mar. 1, 2022, 16 pages.
Li, H. et al., "Pond: CXL-Based Memory Pooling Systems for Cloud Platforms," arXiv:2203.00241v4, Oct. 21, 2022, 17 pages.

(Continued)

*Primary Examiner* — Kurtis Gills
(74) *Attorney, Agent, or Firm* — Alleman Hall LLP

(57) ABSTRACT

A computing system is provided for modeling a deployment of heterogeneous memory on a server network. The computing system receives a user input of parameters including a memory ratio of local memory to heterogeneous memory in each server, a first relative throughput when an entire dataset is in local memory on a server, and a second relative throughput when the entire dataset is in heterogeneous memory on the server. Based on these parameters, the system determines a server ratio of a number of servers in an enhanced cluster with heterogeneous memory to a number of servers in a baseline cluster without heterogeneous memory, where the enhanced cluster and the baseline cluster deliver equivalent data throughput performance. Based on the parameters and the server ratio, a server network design is generated and outputted.

20 Claims, 6 Drawing Sheets

(56) References Cited

OTHER PUBLICATIONS

Yang, Q. et al., “Performance Evaluation on CXL-enabled Hybrid Memory Pool,” Proceedings of IEEE International Conference on Networking, Oct. 3, 2022, Philadelphia, PA, 2 pages. (Submitted with abstract only.).
Das Sharma, D., “Compute Express Link (CXL): Enabling Heterogeneous Data-Centric Computing With Heterogeneous Memory Hierarchy,” IEEE Micro, vol. 43, No. 2, Dec. 12, 2022, 2 pages. (Submitted with abstract only.).
Sun, Y. et al., “Demystifying CXL Memory with Genuine CXL-Ready Systems and Devices,” arXiv:2303.15375v4, Oct. 5, 2023, 15 pages.
Cho, A. et al., “A Case for CXL-Centric Server Processors,” arXiv:2305.05033v1, May 8, 2023, 13 pages.

* cited by examiner

SYSTEMS AND METHODS FOR MODELING A DEPLOYMENT OF HETEROGENEOUS MEMORY ON A SERVER NETWORK

BACKGROUND

In the realm of data center operations, particularly in managing so-called "big data" analytical workloads, the capacity of memory plays a pivotal role. These workloads often necessitate handling large volumes of data, especially when executing tasks that involve serving queries across multiple tables, commonly referred to as join operations. During such operations, multiple servers within a cluster engage in a data exchange process known as a shuffle. This shuffle stage can contribute significantly to the total time taken for query execution.

A technical challenge during the shuffle stage is the potential for the servers to exceed their memory capacity. When their memory capacity is exceeded, data overflow occurs. This overflow of data often results in some of the data being transferred to local disks, a process known as "disk spill". The performance gap between accessing disk storage and accessing memory storage is substantial, and as such, disk spill can considerably increase both the shuffle time and the overall query execution time.

Achieving a desired performance level, measured in queries per second (QPS), necessitates careful management of disk spill during the shuffle stage. This requirement highlights the importance of having sufficient memory capacity within the cluster. However, the memory capacity of a single server is limited by physical and technical constraints, such as the number of DDR slots and the density limitation of DRAM.

Consequently, to ensure adequate memory capacity and thereby meet performance targets, a larger cluster size (i.e., a greater number of servers) is typically required. Often, this involves increasing the deployment of local DDR5 memory, in which DDR5 memory modules are directly connected to the central processing unit (CPU) or a memory controller on the same physical system or motherboard. This direct connection is typically via a standard memory interface, such as a dual in-line memory module (DIMM) slot.

An alternative approach to meeting these performance requirements without expanding the number of servers involves increasing memory capacity through other means, which could lead to significant savings in Total Cost of Ownership (TCO). In this context, heterogeneous memory emerges as a promising option. One example of heterogeneous memory is Compute Express Link (CXL)-attached DDR5 memory, in which DDR5 memory modules are connected to a CPU or memory controller via the CXL interface. CXL is a high-speed, industry-standard interconnect that allows for the coupling of high-speed, low-latency memory with CPUs over a longer physical distance compared to local memory configurations.

As an alternative to local memory, heterogeneous memory allows for a larger memory capacity with fewer servers in a cluster. Heterogeneous memory can be implemented in various forms, including local memory expansion using fabrics other than DDR, remote memory, and disaggregated memory pools.

However, the adoption of heterogeneous memory presents significant challenges, particularly in evaluating its implications on the TCO of running data center applications. Given the novelty of heterogeneous memory, in many cases, mature hardware suitable for experiments is not available. Moreover, due to the scale of data center applications and the limited availability of hardware, it can be challenging, if not impossible, to compare TCO of different computing systems by running actual workloads on real hardware setups.

Therefore, conventional solutions do not provide a reasonable estimation of the benefits and cost implications of using heterogeneous memory in server network applications.

SUMMARY

To address the above issues, a computing system is provided for modeling a deployment of heterogeneous memory on a server network. The computing system includes processing circuitry, and memory storing instructions which are executed by the processing circuitry to receive a user input of parameters including a memory ratio of local memory to heterogeneous memory in each server, a first relative throughput when an entire dataset is in local memory on a server, and a second relative throughput when the entire dataset is in heterogeneous memory on the server. Based on the parameters, the processing circuitry is configured to determine a server ratio of a number of servers in an enhanced cluster with heterogeneous memory to a number of servers in a baseline cluster without heterogeneous memory, where the enhanced cluster and the baseline cluster deliver equivalent data throughput performance. Based on the parameters and the server ratio, a server network design is generated and outputted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
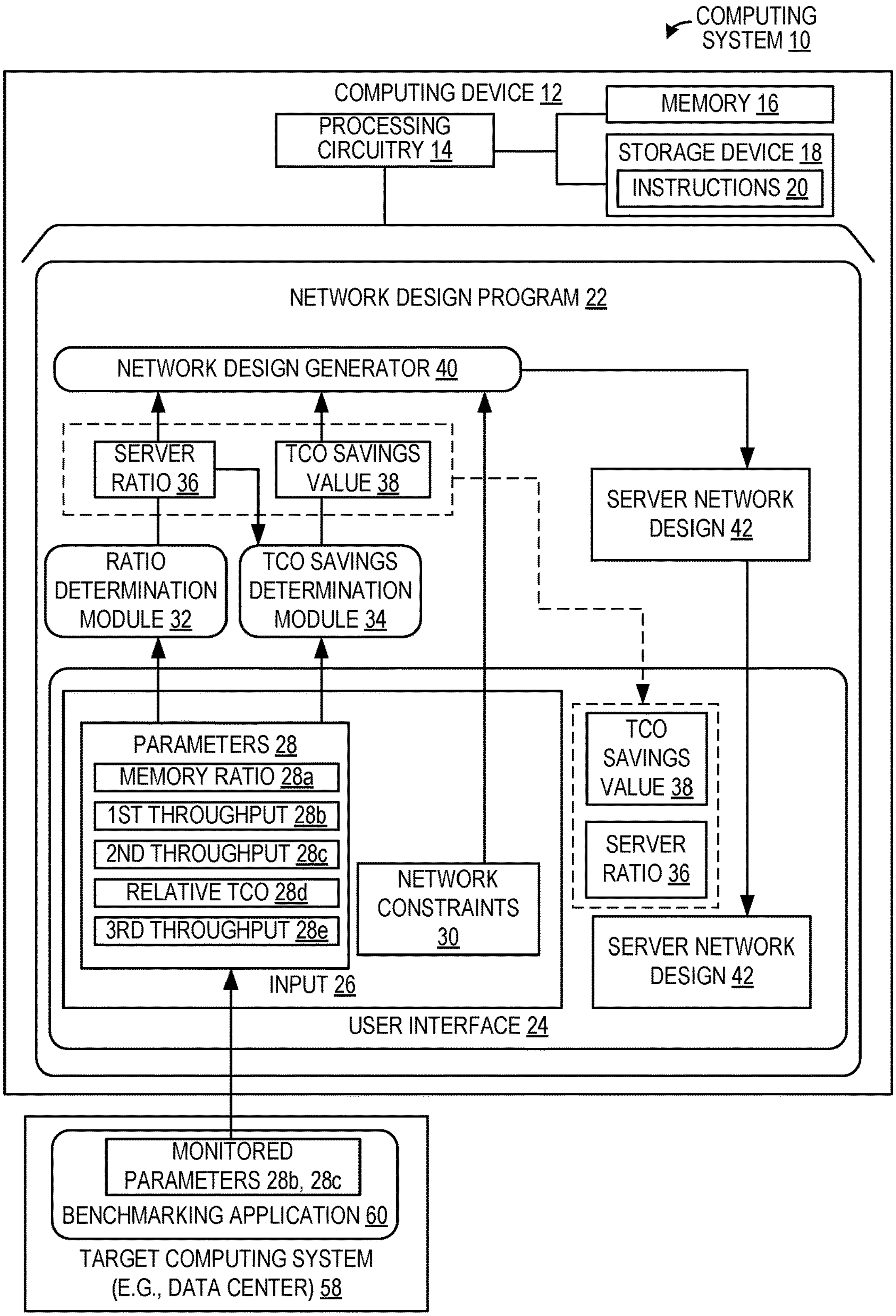
FIG. 1 is a schematic view showing a computing system according to a first example implementation.

To address the issues described above, FIG. 1 illustrates a schematic view of a computing system 10 for modeling a deployment of heterogeneous memory on a server network, according to a first example implementation. The computing system 10 includes a computing device 12 having processing circuitry 14, memory 16, and a storage device 18 storing instructions 20. The network design program 22 is executed by the processing circuitry 14 to receive a user input 26 of parameters 28, which include at least a memory ratio **28*a* of local memory to heterogeneous memory in each server, a first relative throughput 28***b* when an entire dataset is in local memory on the server, and a second relative throughput 28*c* when the entire dataset is in heterogeneous memory on the server. For example, a memory ratio 28*a* of two means the server has twice as much local memory capacity as heterogeneous memory.

The parameters 28 in the user input 26 may also include a relative TCO 28*d* comparing the TCO of an enhanced server equipped with heterogeneous memory relative to the TCO of a baseline server without heterogeneous memory. For example, if an enhanced server with heterogeneous memory costs 10% more than the baseline server, then the relative TCO 28*d* is 1.1. The parameters 28 may also include a third relative throughput 28*e* to which the first relative throughput 28*b* and/or the second relative throughput 28*c* are normalized. The third relative throughput 28*e* may be a relative throughput when an entire dataset is spilled onto a local disk on a server. For example, the third relative throughput 28*e* may be one.

In this first example implementation, the computing system 10 takes the form of a single computing device 12 storing instructions 20 in the storage device 18, including the network design program 22 with modules 32, 34. Based on the parameters 28, the ratio determination module 32 is configured to determine a server ratio 36 of a number of servers in the enhanced cluster with heterogeneous memory to a number of servers in the baseline cluster without heterogeneous memory, where the enhanced cluster and the baseline cluster deliver equivalent data throughput performance.

This equivalence in performance may be established by defining a predetermined threshold or percentage that is considered acceptable for variation between the enhanced cluster and the baseline cluster. For example, if the predetermined threshold is set at 1%, this implies that the data throughput performance of the enhanced server cluster and the baseline server cluster is considered the same or similar if their performance metrics differ by no more than 1%.

The TCO savings determination module 34 is configured to calculate a TCO savings value 38 indicating the percentage reduction of TCO that is predicted by deploying heterogeneous memory in the servers in accordance with the inputted parameters 28. The server ratio 36 and TCO savings value 38 may be subsequently displayed on the user interface 24.

A user interface 24 (in some implementations, a user interface API) may be provided for the user to input the parameters 28. In the user interface 24, the user specifies the memory ratio 28*a* of local memory to heterogeneous memory in each server, so that the user may model a wide range of memory configurations. The user interface 24 is also configured to receive user input 26 of the first relative throughput 28*b* when the entire dataset is in local memory, the second relative throughput 28*c* for when the dataset is entirely in heterogeneous memory, and the relative TCO 28*d*.

The user interface 24 may be configured to be intuitive and user-friendly by featuring a dashboard with input fields, sliders, and/or dropdown menus for entering and adjusting these parameters. Interactive elements like sliders for inputting memory ratios and throughput values may allow users to experiment with different scenarios and immediately see how changes to the parameters 28 would affect both server numbers and TCO. The user interface 24 may also allow for the user to save different configuration scenarios and display different configuration scenarios side-by-side to allow the user to view and compare the effects on data throughput performance of varying the memory ratio 28*a* and/or the relative throughputs 28*b*, 28*c*.

The relative throughputs 28*b*, 28*c*, including the first relative throughput 28*b* when the entire dataset is in local memory on the server and the second relative throughput 28*c* when the entire dataset is in heterogeneous memory on the server, can be determined and generated by a benchmarking application 60 configured to measure the throughput of data processing of a target computing system 58 using local memory and heterogeneous memory under different workload scenarios. Additionally or alternatively, the relative throughputs 28*b*, 28*c* may be estimated by analyzing historical data from the user's existing server networks. The target computing system 58, which is not particularly limited, may be populated with a multitude of systems, including but not limited to servers, switches, routers, and storage devices.

The workload scenarios may include capacity-bound applications where the performance is primarily limited by the available capacity of certain system resources, such as memory or storage. Examples include big data analytics platforms (Spark SQL, Apache Hadoop, or Apache Flink, for example), in-memory databases (SAP HANA, Redis, or MemSQL, for example), high-performance computing applications, machine learning and artificial intelligence applications, video processing applications, virtualization environments, graphic rendering and simulation applications, bioinformatics applications, and cloud computing services. In each of these applications, the performance can be significantly affected by the available memory capacity. Therefore, optimizing memory usage through a combination of local memory and heterogeneous memory can lead to substantial improvements in efficiency and cost-effectiveness.

Benchmarking application 60 may measure the throughput of data processing using local memory and heterogeneous memory by conducting a series of tests designed to assess the performance of memory under various conditions. Once the servers equipped with local memory and heterogeneous memory are configured and set up, and the benchmarking application 60 is installed on the servers, the benchmarking application 60 may simulate data-intensive tasks that are typical in data centers, such as database operations, data analytics, and machine learning workloads. These tasks may be chosen to represent the types of operations that would typically utilize large amounts of memory.

During the test runs, the benchmarking application 60 may collect data on how quickly the system can process and transfer data. This data may be gathered under different configurations and loads to assess the performance of both local memory and heterogeneous memory systems. The relative throughputs 28*b*, 28*c* may be measured in operations per second (e.g., queries per second) or data processed per unit time (e.g., gigabytes per second). The benchmarking application 60 may also analyze how each type of memory is utilized during the tests, including data access patterns, latency, and any instances of disk spill.

To determine the server ratio 36, the ratio determination module 32 first subtracts one from the first relative throughput 28*b*, and this subtracted value is multiplied together with the product of the memory ratio 28*a* and the second relative throughput 28*c* to calculate the nominator value.

To calculate the denominator value, the second relative throughput 28*c* is multiplied by the first relative throughput 28*b* and then by the memory ratio increased by one. The first relative throughput 28$b$ and the product of the memory ratio 28$a$ and the second relative throughput 28$c$ are subtracted from the resulting value.

The above mathematical operations are expressed in Equation 1 below:

$$\frac{N_h}{N_b} = \frac{CR_c(R_d - 1)}{R_cR_d(C+1) - CR_c - R_d} \quad \text{(Equation 1)}$$

In the above equation, $N_h/N_b$ is the server ratio 36, $N_b$ is the number of servers in the baseline cluster without heterogeneous memory, $N_h$ is the number of servers in the enhanced cluster with heterogeneous memory to deliver equivalent data throughput performance as the baseline cluster, C is the memory ratio 28$a$ of local memory to heterogeneous memory on each server, $R_d$ is the first relative throughput 28$b$ when the entire dataset is in local memory on a server, and $R_c$ is the second relative throughput 28$c$ when the entire dataset is in heterogeneous memory on a server.

The TCO savings determination module 34 receives input of the relative TCO 28$d$ and the server ratio 36 outputted by the ratio determination module 32 to determine and generate a TCO savings value 38 by subtracting the product of the server ratio 36 and the relative TCO 28$d$ from one. This mathematical operation is expressed in Equation 2 below:

$$S = 1 - R_t\frac{N_h}{N_b} \quad \text{(Equation 2)}$$

Here, S is the TCO savings value 38, $R_t$ is the relative TCO 28$d$, and $N_h/N_b$ is the server ratio 36.

The network design generator 40 is configured to receive the calculated server ratio 36 of a number of servers in the enhanced cluster with heterogeneous memory to a number of servers in the baseline cluster without heterogeneous memory, where the enhanced cluster and the baseline cluster deliver equivalent data throughput performance, and TCO savings value 38 as input to generate an optimized server network design 42.

Upon receiving these inputs, the network design generator 40 engages in a comprehensive analysis, using a design model which takes into consideration the necessary balance between memory capacity, server count, and network architecture. The network design generator 40 also accounts for various network constraints 30 such as physical space, power consumption, cooling requirements, and connectivity, thereby ensuring that the outputted server network design 42 adheres to these network constraints 30 while fulfilling performance and capacity requirements. The network constraints 30 may be part of the user input 26 which is received by the user interface 24. In this example, the network constraints 30 include a power consumption requirement not to exceed 120 kW, cooling requirements to maintain the servers in a 22° C. ambient environment, and connectivity requirements to support a minimum bandwidth of 10 Gbps per server and 40 Gbps to external networks.

The final server network design 42 is generated based on the calculated server ratio 36, ensuring servers with an optimal mix of local memory and heterogeneous memory. The server network design 42 is also influenced by the TCO savings value 38, thereby achieving cost-effectiveness while maintaining or enhancing throughput performance.

The outputted server network design 42 may provide a schematic or graphical depiction that illustrates the layout and connectivity of the server cluster, including specifics on server types, memory configurations, network topology, and interconnect strategies. The server network design 42 may also include documentation of performance projections, cost analysis, and implementation guidelines.

The network design generator 40 of the network design program 22 exemplifies a highly sophisticated, data-driven approach to generating optimized server network designs, adeptly incorporating complex inputs regarding TCO savings 38 and server ratios 36, thereby ensuring that the final server network design 42 achieves a harmonious balance between cost-efficiency, performance, and scalability, tailored to the specific needs and constraints of the server environment.

Figure 2:
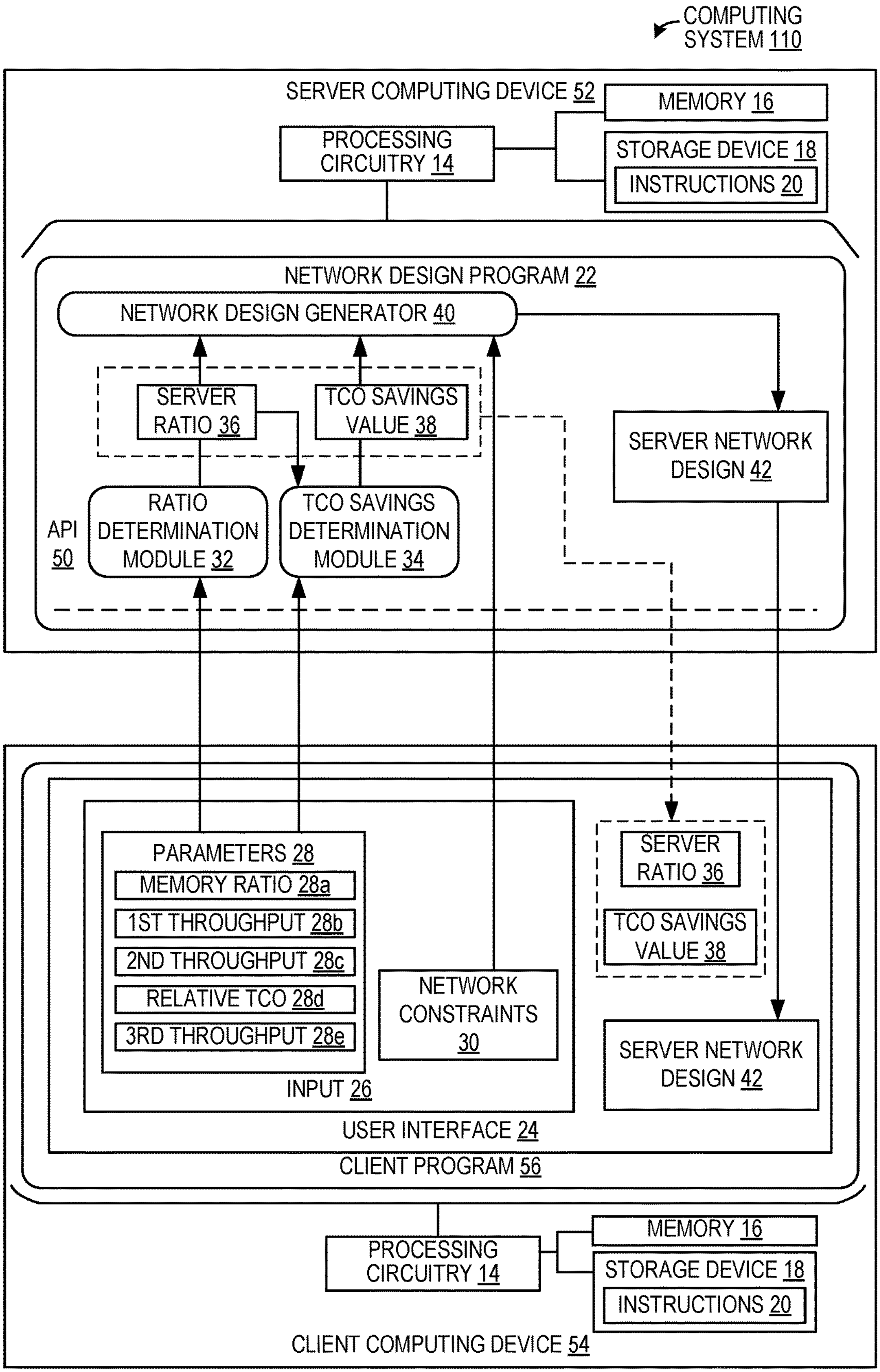
FIG. 2 is a schematic view showing a computing system according to a second example implementation.

Turning to FIG. 2, a computing system 110 according to a second example implementation is illustrated, in which the computing system 110 includes a server computing device 52 and a client computing device 54. Here, both the server computing device 52 and the client computing device 54 may include respective processing circuitry 14, memory 16, and storage devices 18. Description of identical components to those in FIG. 1 will not be repeated. The client computing device 54 may be configured to present the user interface 24 as a result of executing a client program 56 by the processing circuitry 14 of the client computing device 54. However, as in the example of FIG. 1, the relative throughputs 28$b$, 28$c$ may additionally or alternatively be determined and generated by a benchmarking application 60 instead of being inputted at the user interface 24 by a human operator.

The client computing device 54 may be responsible for communicating between the user operating the client computing device 54 and the server computing device 52 which executes the network design program 22 and contains the ratio determination module 32, the TCO savings determination module 34, and the network design generator 40, via an application programming interface (API) 50 of the network design program 22. The client computing device 54 may take the form of a personal computer, laptop, tablet, smartphone, smart speaker, etc. The same processes described above with reference to FIG. 1 may be performed, except in this case the user input 26 and the server network design 42 may be communicated between the server computing device 52 and the client computing device 54 via a network such as the Internet.

Figure 3:
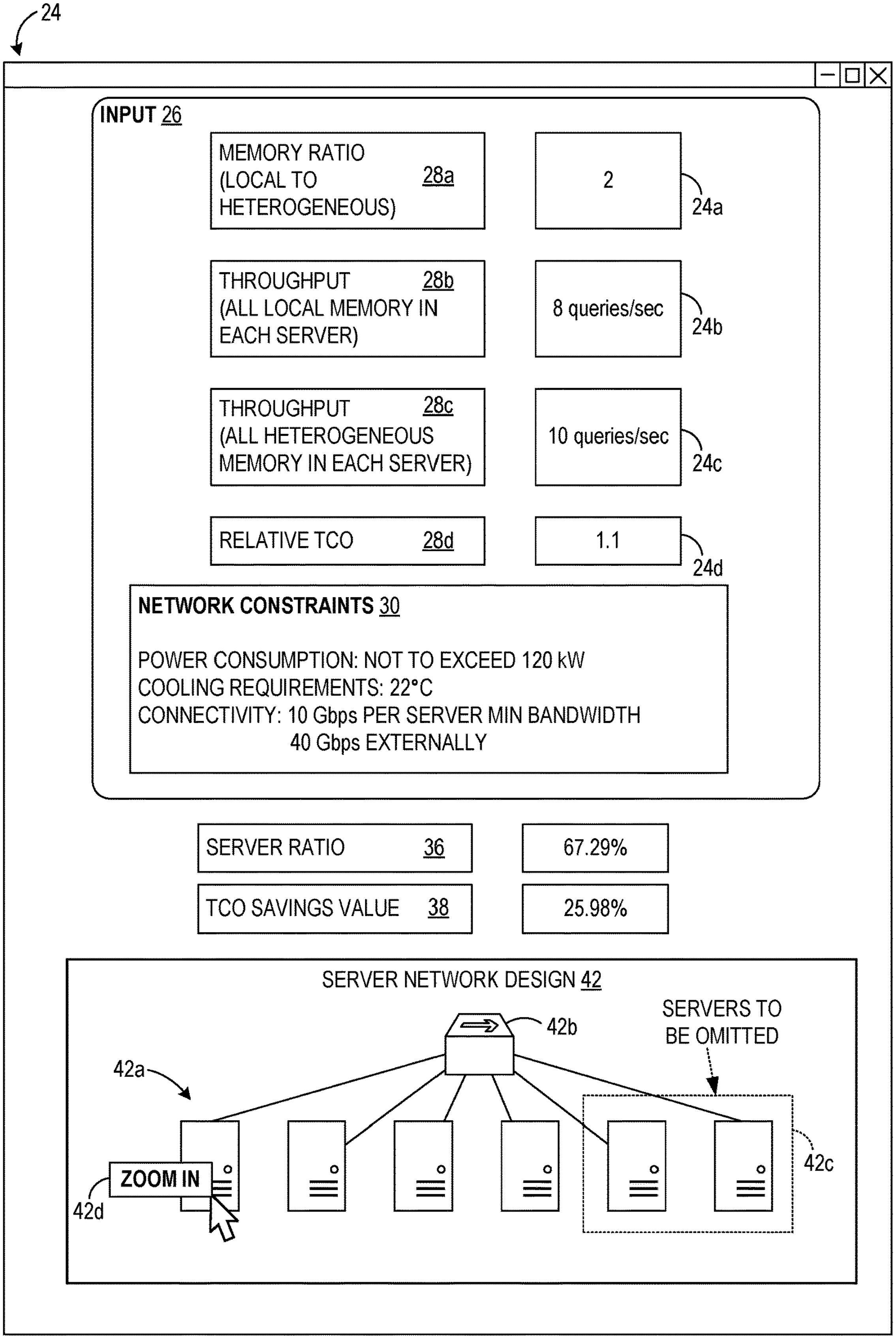
FIG. 3 is a schematic view showing inputs and outputs of the network design program of FIG. 1 or FIG. 2 according to an example implementation.

Turning to FIG. 3, an example of the user interface 24 of the network design program 22 and its operational mechanics is illustrated. This user interface 24 is configured to facilitate user interaction for network configuration and optimization. The user interface 24 features input fields 24$a$-$d$ that allow users to specify important=parameters influencing the network design.

The user interface 24 includes an input field 24$a$ where users can adjust the memory ratio 28$a$ of local memory to heterogeneous memory in each server within the server network. This ratio 28$a$ is an important determinant in the configuration of memory resources across the network. The user interface 24 also encompasses an input field 24$b$ for entering the first relative throughput 28$b$ when the entire dataset resides in local memory, an input field 24$c$ for entering the second relative throughput 28$c$ for scenarios where the dataset is entirely within heterogeneous memory, and an input field 24$d$ for entering a relative TCO. These throughput values 28$b$, 28$c$ influence the performance characteristics of different memory configurations.

Responsive to inputting these values, including a memory ratio 28*a* of two, a first relative throughput 28*b* of eight, a second relative throughput 28*c* of ten, and a relative TCO 28*d* of 1.1, the ratio determination module 32 within the network design program 22 processes this data. The ratio determination module 32 computes a server ratio 36, which in this instance is calculated to be 67.29%. This computed server ratio 36 is then displayed on the user interface 24, offering immediate feedback on the impact of the entered parameters 28 on the server network design 42.

The TCO savings determination module 34 of the network design program 22 utilizes the generated server ratio 36 and the relative TCO 28*d* as inputs to calculate a TCO savings value 38, which, in the described example, amounts to 25.98%. The TCO savings value 38, indicative of the cost efficiency of the generated server network design 42, is also displayed on the user interface 24, providing a comprehensive view of the economic implications of the selected configurations.

Based on these computations, the network design generator 40 generates a server network design 42 in accordance with the outputted server ratio 36. In the given example, a server ratio 36 of 67.29% implies a potential reduction in the number of servers by 32.71% by integrating heterogeneous memory in each server, following the specified memory ratio 28*a*. The network design generator 40 generates the server network design 42 by configuring the memory in each server to mirror the user-defined memory ratio 28*a*. Moreover, the network design generator 40 takes into account the various network constraints 30 inputted by the user, such as physical space requirements, power consumption, cooling needs, and connectivity options. This careful consideration ensures that the final server network design 42 is not only optimized for performance and cost but also aligns with the practical and operational limitations of the network environment.

In this example, the server network design 42 is depicted with a series of servers 42*a* aligned in a linear arrangement and connected to a hub 42*b*, visually representing the conventional configuration of servers within a data center or server network. This server network design 42 is configured to visualize the impact of deploying heterogeneous memory within the network, as dictated by user-defined parameters, including the user-defined memory ratio 28*a* and relative throughputs 28*b*, 28*c*.

The server network design 42 may be rendered in a manner that shows the reduction in the total number of servers as a consequence of integrating heterogeneous memory, in accordance with the specified memory ratio 28*a* and relative throughput values 28*b*, 28*c* entered via the user interface 24. Notably, this reduction is symbolically represented by dotted lines 42*c*, which mark the servers that may be eliminated or consolidated from the network upon the deployment of heterogeneous memory. These dotted lines 42*c* serve as a clear, visual indication of the efficiency gains and space optimization achieved through the deployment of heterogeneous memory on the servers.

Additionally, the server network design 42 incorporates an interactive element, a selector tool 42*d*, enabling users to engage more deeply with the network schematic. This selector 42*d* allows for the selection and magnification of individual servers within the network. Upon selection, the server network design 42 reveals detailed memory schematics for the chosen server. These schematics provide an in-depth view of the memory configuration, including the distribution and arrangement of local DDR memory and heterogeneous memory within the server. This feature may be invaluable for users seeking to understand the precise implementation of memory resources at the server level, further highlighting the practical implications of their input parameters 28 on the overall server network design 42.

Accordingly, the interactive and illustrative features of the server network design 42 offers a multifaceted understanding of the benefits and changes brought about by the strategic deployment of heterogeneous memory. The generated server network design 42 not only demonstrates the potential for a more compact and efficient server network but also enhances the user's comprehension of the memory allocation and its operational impacts within individual servers. Such a design 42 may be particularly beneficial in scenarios where optimization of physical space, power consumption, and memory performance are especially important in the proper functioning of the server network.

Figure 4:
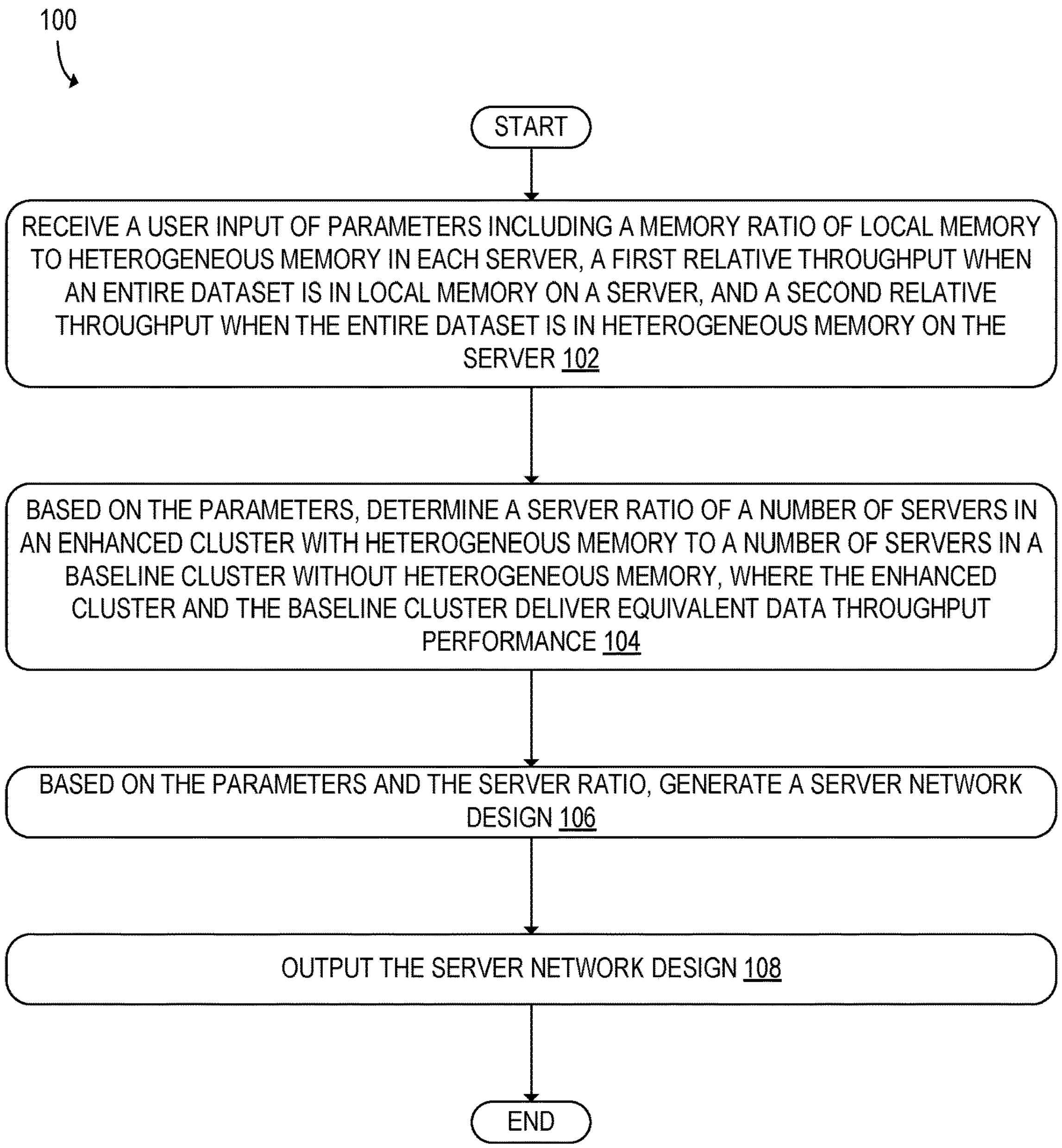
FIG. 4 shows a flowchart for a first method according to one example implementation.

FIG. 4 shows a flowchart for a first method 100 for modeling a deployment of heterogeneous memory on a server network, according to one example implementation. The first method 100 may be implemented by the computing system 10 or 110 illustrated in FIGS. 1 and 2, respectively.

At 102 of the method, a user input of parameters is received, including a memory ratio of local memory to heterogeneous memory in each server, a first relative throughput when an entire dataset is in local memory on a server, and a second relative throughput when the entire dataset is in heterogeneous memory on the server. The first relative throughput and the second relative throughput may be generated by a benchmarking application configured to measure a throughput of data processing of a target computing system, or by estimating by analyzing historical data of a server network. The first relative throughput and the second relative throughput may be normalized to a third relative throughput, which is a relative throughput when an entire dataset is spilled onto a local disk on the server.

At 104 of the method, based on the parameters, a server ratio of a number of servers in an enhanced cluster with heterogeneous memory to a number of servers in a baseline cluster without heterogeneous memory is determined, where the enhanced cluster and the baseline cluster deliver equivalent data throughput performance. The server ratio may be determined using Equation 1, where $N_h/N_b$ is the server ratio, $N_b$ is a number of servers in the baseline cluster without heterogeneous memory, $N_h$ is a number of servers in the enhanced cluster with heterogeneous memory to deliver equivalent data throughput performance as the baseline cluster, C is the memory ratio of local memory to heterogeneous memory on each server, $R_d$ is the first relative throughput when the entire dataset is in local memory on the server, and $R_c$ is the second relative throughput when the entire dataset is in heterogeneous memory on the server.

At 106 of the method, based on the parameters and the server ratio, a server network design is generated. The server network design may also be generated based on a TCO savings value indicating a percentage reduction of TCO that is predicted by deploying heterogeneous memory in the servers in accordance with the inputted parameters. At 108 of the method, the server network design is outputted. The server network design may be rendered to show a reduction in a total number of servers as a consequence of integrating heterogeneous memory in accordance with the memory ratio, the first relative throughput, and the second relative throughput.

Figure 5:
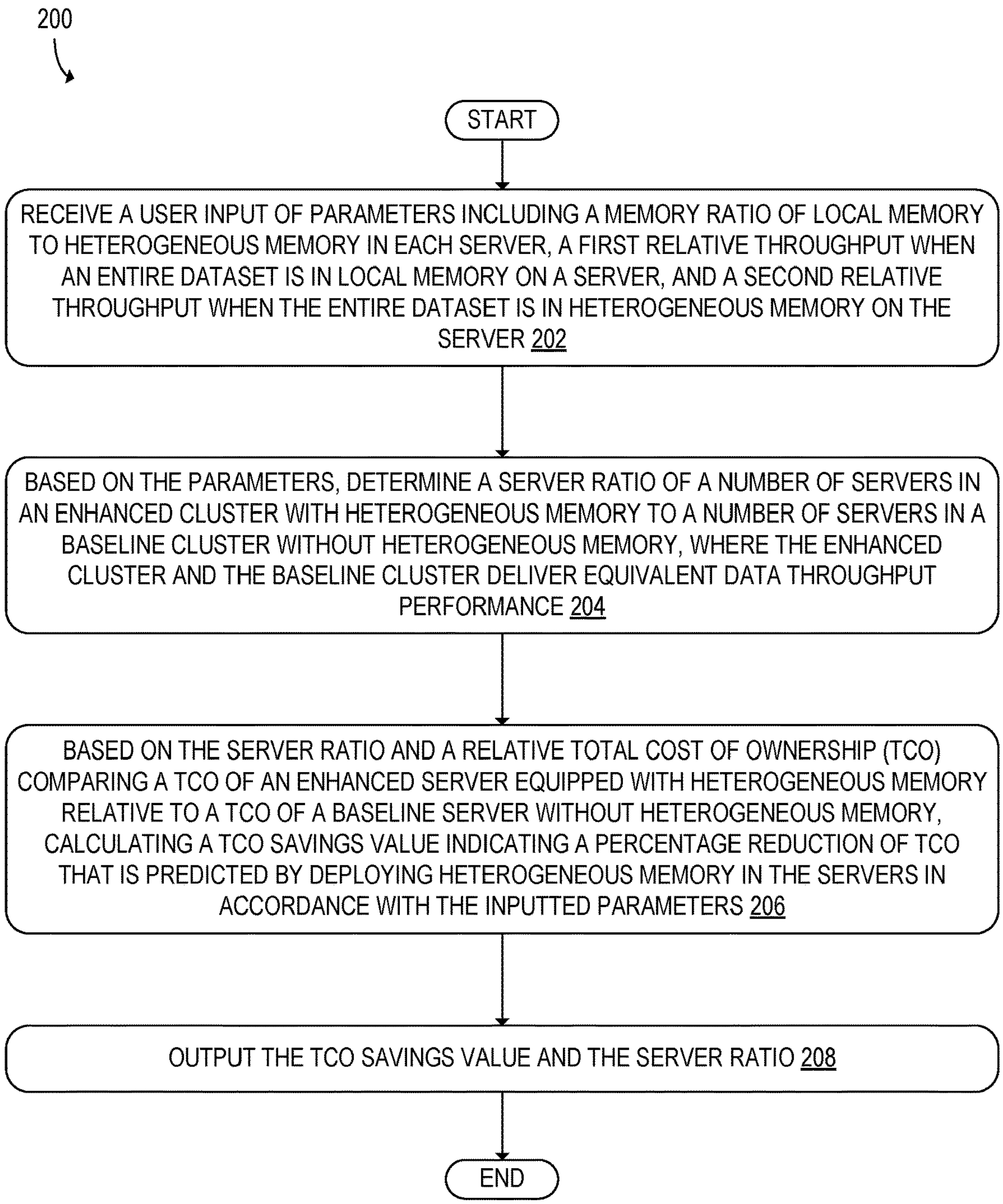
FIG. 5 shows a flowchart for a second method according to one example implementation.

FIG. 5 shows a flowchart for a second method 200 for modeling a deployment of heterogeneous memory on a server network, according to one example implementation.

The second method 200 may be implemented by the computing system 10 or 110 illustrated in FIGS. 1 and 2, respectively.

At 202, the method includes receiving a user input of parameters including a memory ratio of local memory to heterogeneous memory in each server, a first relative throughput when an entire dataset is in local memory on a server, and a second relative throughput when the entire dataset is in heterogeneous memory on the server.

At 204, the method includes, based on the parameters, determining a server ratio of a number of servers in an enhanced cluster with heterogeneous memory to a number of servers in a baseline cluster without heterogeneous memory, where the enhanced cluster and the baseline cluster deliver equivalent data throughput performance.

At 206, the method includes, based on the server ratio and a relative TCO comparing a TCO of an enhanced server equipped with heterogeneous memory relative to a TCO of a baseline server without heterogeneous memory, calculating a TCO savings value indicating a percentage reduction of TCO that is predicted by deploying heterogeneous memory in the servers in accordance with the inputted parameters. At 208, the method includes outputting the TCO savings value and the server ratio.

The above-described systems and methods are capable of modeling a workload performance of a server network deploying heterogeneous memory to generate a comprehensive, customized server network design that balances cost, performance, and scalability. The performance and cost implications of different server memory configurations may be accurately modeled and compared. The generated server network design may be presented in a way that is actionable and easy to interpret, providing a valuable tool for organizations looking to optimize their server network infrastructure.

In some embodiments, the methods and processes described herein may be tied to a computing system of one or more computing devices. In particular, such methods and processes may be implemented as a computer-application program or service, an API, a library, and/or other computer-program product. In some embodiments, the methods and processes described herein may be tied to a computing system of one or more computing devices. In particular, such methods and processes may be implemented as a computer-application program or service, an API, a library, and/or other computer-program product.

Figure 6:
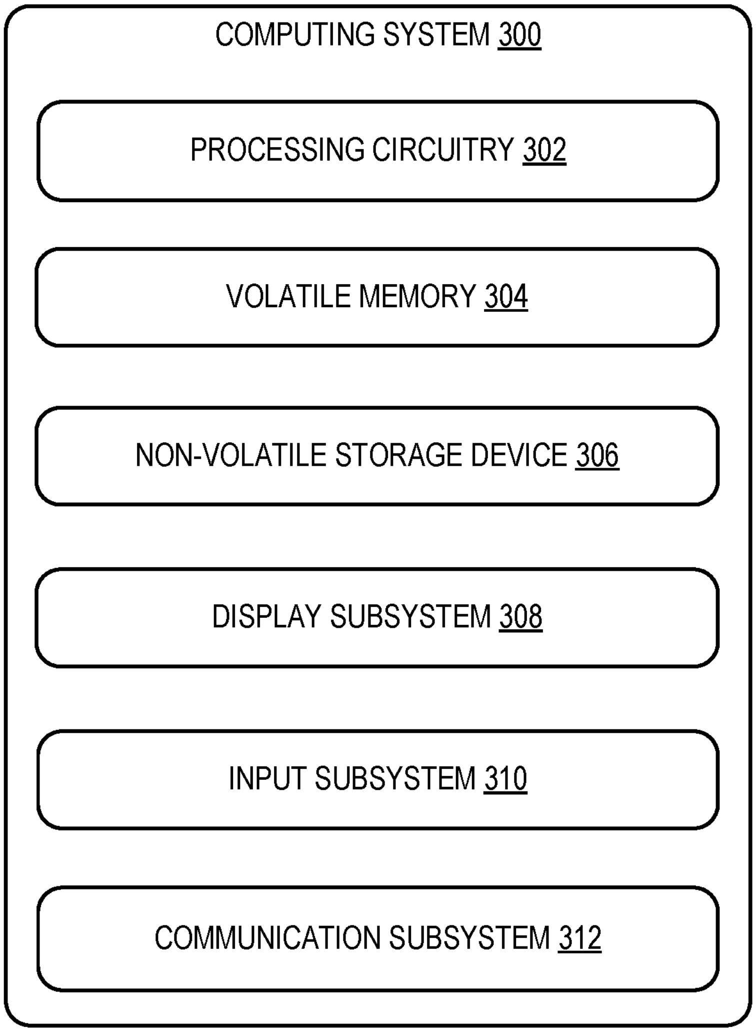
FIG. 6 shows a schematic view of an example computing environment in which the computing system of FIG. 1 or FIG. 2 may be enacted.

FIG. 6 schematically shows a non-limiting embodiment of a computing system 300 that can enact one or more of the methods and processes described above. Computing system 300 is shown in simplified form. Computing system 300 may embody the computing systems 10 and 110 described above and illustrated in FIGS. 1 and 2, respectively. Components of computing system 300 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 300 includes processing circuitry 302, volatile memory 304, and a non-volatile storage device 306. Computing system 300 may optionally include a display subsystem 308, input subsystem 310, communication subsystem 312, and/or other components not shown in FIG. 6.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 302 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 302.

Non-volatile storage device 306 includes one or more physical devices configured to hold instructions executable by the processing circuitry to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by processing circuitry 302 to temporarily store information during processing of software instructions. It will be appreciated that volatile memory 304 typically does not continue to store instructions when power is cut to the volatile memory 304.

Aspects of processing circuitry 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via processing circuitry 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a GUI. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with processing circuitry 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 300 to send and/or receive messages to and/or from other devices via a network such as the Internet.

The following paragraphs provide additional description of the subject matter of the present disclosure. One aspect provides for a computing system for modeling a deployment of heterogeneous memory on a server network, the system comprising processing circuitry and memory storing instructions which are executed by the processing circuitry to receive a user input of parameters including a memory ratio of local memory to heterogeneous memory in each server, a first relative throughput when an entire dataset is in local memory on a server, and a second relative throughput when the entire dataset is in heterogeneous memory on the server, based on the parameters, determine a server ratio of a number of servers in an enhanced cluster with heterogeneous memory to a number of servers in a baseline cluster without heterogeneous memory, where the enhanced cluster and the baseline cluster deliver equivalent data throughput performance, based on the parameters and the server ratio, generate a server network design, and output the server network design. In this aspect, additionally or alternatively, the processing circuitry may be further configured to calculate a Total Cost of Ownership (TCO) savings value indicating a percentage reduction of TCO that is predicted by deploying heterogeneous memory in the servers in accordance with the inputted parameters, where the server network design is generated based on the TCO savings value. In this aspect, additionally or alternatively, the TCO savings value may be determined by subtracting a product of the server ratio and the relative TCO from one, where the relative TCO compares a TCO of an enhanced server equipped with heterogeneous memory relative to a TCO of a baseline server without heterogeneous memory. In this aspect, additionally or alternatively, the first relative throughput and the second relative throughput may be generated by benchmarking application configured to measure a throughput of data processing of a target computing system. In this aspect, additionally or alternatively, the first relative throughput and the second relative throughput may be estimated by analyzing historical data of a server network. In this aspect, additionally or alternatively, the server ratio may be determined by dividing a nominator value by a denominator value, and to calculate the nominator value, one is subtracted from the first relative throughput, and the resulting subtracted value is multiplied together with a product of the memory ratio and the second relative throughput, and to calculate the denominator value, the second relative throughput is multiplied by the first relative throughput and then by the memory ratio increased by one, then the first relative throughput and the product of the memory ratio and the second relative throughput are subtracted from the resulting multiplied value. In this aspect, additionally or alternatively, the first relative throughput and the second relative throughput may be normalized to a third relative throughput, which is a relative throughput when the entire dataset is spilled onto a local disk on the server. In this aspect, additionally or alternatively, the server network design may be generated based on network constraints which are part of the user input. In this aspect, additionally or alternatively, the server network design may be rendered to show a reduction in a total number of servers as a consequence of integrating heterogeneous memory in accordance with the memory ratio, the first relative throughput, and the second relative throughput. In this aspect, additionally or alternatively, a user interface may be provided to receive the user input of the parameters, and the user interface is configured to display different configuration scenarios side-by-side to allow a user to view and compare effects on the data throughput performance of varying the memory ratio, the first relative throughput, and the second relative throughput.

Another aspect provides a method for modeling a deployment of heterogeneous memory on a server network, the method comprising receiving a user input of parameters including a memory ratio of local memory to heterogeneous memory in each server, a first relative throughput when an entire dataset is in local memory on a server, and a second relative throughput when the entire dataset is in heterogeneous memory on the server, based on the parameters, determining a server ratio of a number of servers in an enhanced cluster with heterogeneous memory to a number of servers in a baseline cluster without heterogeneous memory, where the enhanced cluster and the baseline cluster deliver equivalent data throughput performance, based on the parameters and the server ratio, generating a server network design, and outputting the server network design. In this aspect, additionally or alternatively, the method may further comprise calculating a Total Cost of Ownership (TCO) savings value indicating a percentage reduction of TCO that is predicted by deploying heterogeneous memory in the servers in accordance with the inputted parameters, and the server network design is generated based on the TCO savings value. In this aspect, additionally or alternatively, the TCO savings value may be determined by subtracting a product of the server ratio and the relative RCO from one, where the relative TCO compares a TCO of an enhanced server equipped with heterogeneous memory relative to a TCO of a baseline server without heterogeneous memory. In this aspect, additionally or alternatively, the first relative throughput and the second relative throughput may be generated by benchmarking application configured to measure a throughput of data processing of a target computing system. In this aspect, additionally or alternatively, the first relative throughput and the second relative throughput may be estimated by analyzing historical data of a server network. In this aspect, additionally or alternatively, the server ratio may be determined by dividing a nominator value by a denominator value, where to calculate the nominator value, one is subtracted from the first relative throughput, and the resulting subtracted value is multiplied together with a product of the memory ratio and the second relative throughput, and to calculate the denominator value, the second relative throughput is multiplied by the first relative throughput and then by the memory ratio increased by one, then the first relative throughput and the product of the memory ratio and the second relative throughput are subtracted from the resulting multiplied value. In this aspect, additionally or alternatively, the first relative throughput and the second relative throughput may be normalized to a third relative throughput, which is a relative throughput when the entire dataset is spilled onto a local disk on the server. In this aspect, additionally or alternatively, the server network design may be rendered to show a reduction in a total number of servers as a consequence of integrating heterogeneous memory in accordance with the memory ratio, the first relative throughput, and the second relative throughput. In this aspect, additionally or alternatively, a user interface may be provided to receive the user input of the parameters, and the user interface is configured to display different configuration scenarios side-by-side to allow a user to view and compare effects on the data throughput performance of varying the memory ratio, the first relative throughput, and the second relative throughput.

Another aspect provides a computing system for modeling a deployment of heterogeneous memory on a server network, the system comprising processing circuitry and memory storing instructions which are executed by the processing circuitry to receive a user input of parameters including a memory ratio of local memory to heterogeneous memory in each server, a first relative throughput when an entire dataset is in local memory on a server, and a second relative throughput when the entire dataset is in heterogeneous memory on the server, based on the parameters, determine a server ratio of a number of servers in an enhanced cluster with heterogeneous memory to a number of servers in a baseline cluster without heterogeneous memory, where the enhanced cluster and the baseline cluster deliver equivalent data throughput performance, based on the server ratio and a relative Total Cost of Ownership (TCO) comparing a TCO of an enhanced server equipped with heterogeneous memory relative to a TCO of a baseline server without heterogeneous memory, calculate a TCO savings value indicating a percentage reduction of TCO that is predicted by deploying heterogeneous memory in the servers in accordance with the inputted parameters, and output the TCO savings value and the server ratio.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for modeling a deployment of heterogeneous memory on a server network, the system comprising:

processing circuitry and memory storing instructions which are executed by the processing circuitry to:

receive a user input of parameters including a memory ratio of local memory to heterogeneous memory in each server computing device, a first relative throughput when an entire dataset is in local memory on a server computing device, and a second relative throughput when the entire dataset is in heterogeneous memory on the server computing device;

based on the parameters, determine a server ratio of a number of server computing devices, each server computing device executing data-processing workloads, in an enhanced cluster with heterogeneous memory to a number of server computing devices in a baseline cluster without heterogeneous memory, wherein the enhanced cluster and the baseline cluster deliver equivalent data throughput performance for the data-processing workloads;

based on the parameters and the server ratio, generate a server network design; and output the server network design, wherein the local memory is local DRAM; and the heterogeneous memory is Compute Express Link (CXL)-attached DRAM.

2. The computing system of claim 1, wherein the processing circuitry is further configured to:

calculate a Total Cost of Ownership (TCO) savings value indicating a percentage reduction of TCO that is predicted by deploying heterogeneous memory in the server computing devices in accordance with the inputted parameters, wherein the server network design is generated based on the TCO savings value.

3. The computing system of claim 2, wherein the TCO savings value is determined by subtracting a product of the server ratio and the relative TCO from one, wherein the relative TCO compares a TCO of an enhanced server computing device equipped with heterogeneous memory relative to a TCO of a baseline server computing device without heterogeneous memory.

4. The computing system of claim 1, wherein the first relative throughput and the second relative throughput are generated by benchmarking application configured to measure a throughput of data processing of a target computing system.

5. The computing system of claim 1, wherein the first relative throughput and the second relative throughput are estimated by analyzing historical data of a server network.

6. The computing system of claim 1, wherein the server ratio is determined by dividing a nominator value by a denominator value, wherein to calculate the nominator value, one is subtracted from the first relative throughput, and the resulting subtracted value is multiplied together with a product of the memory ratio and the second relative throughput; and to calculate the denominator value, the second relative throughput is multiplied by the first relative throughput and then by the memory ratio increased by one, then the first relative throughput and the product of the memory ratio and the second relative throughput are subtracted from the resulting multiplied value.

7. The computing system of claim 1, wherein the first relative throughput and the second relative throughput are normalized to a third relative throughput, which is a relative throughput when the entire dataset is spilled onto a local disk on the server computing device.

8. The computing system of claim 1, wherein the server network design is generated based on network constraints which are part of the user input.

9. The computing system of claim 1, wherein the server network design is rendered to show a reduction in a total number of server computing devices as a consequence of integrating heterogeneous memory in accordance with the memory ratio, the first relative throughput, and the second relative throughput.

10. The computing system of claim 1, wherein a user interface is provided to receive the user input of the parameters; and the user interface is configured to display different configuration scenarios side-by-side to allow a user to view and compare effects on the data throughput performance of varying the memory ratio, the first relative throughput, and the second relative throughput.

11. A method for modeling a deployment of heterogeneous memory on a server network, the method comprising:

receiving a user input of parameters including a memory ratio of local memory to heterogeneous memory in each server computing device, a first relative throughput when an entire dataset is in local memory on a server computing device, and a second relative throughput when the entire dataset is in heterogeneous memory on the server computing device;

based on the parameters, determining a server ratio of a number of server computing devices, each server computing device executing data-processing workloads, in an enhanced cluster with heterogeneous memory to a number of server computing devices in a baseline cluster without heterogeneous memory, wherein the enhanced cluster and the baseline cluster deliver equivalent data throughput performance for the data-processing workloads;

based on the parameters and the server ratio, generating a server network design; and outputting the server network design, wherein the local memory is local DRAM; and the heterogeneous memory is Compute Express Link (CXL)-attached DRAM.

12. The method of claim 11, further comprising:

calculating a Total Cost of Ownership (TCO) savings value indicating a percentage reduction of TCO that is predicted by deploying heterogeneous memory in the server computing devices in accordance with the inputted parameters, wherein the server network design is generated based on the TCO savings value.

13. The method of claim 12, wherein the TCO savings value is determined by subtracting a product of the server ratio and the relative RCO from one, wherein the relative TCO compares a TCO of an enhanced server computing device equipped with heterogeneous memory relative to a TCO of a baseline server computing device without heterogeneous memory.

14. The method of claim 11, wherein the first relative throughput and the second relative throughput are generated by benchmarking application configured to measure a throughput of data processing of a target computing system.

15. The method of claim 11, wherein the first relative throughput and the second relative throughput are estimated by analyzing historical data of a server network.

16. The method of claim 11, wherein the server ratio is determined by dividing a nominator value by a denominator value, wherein to calculate the nominator value, one is subtracted from the first relative throughput, and the resulting subtracted value is multiplied together with a product of the memory ratio and the second relative throughput; and to calculate the denominator value, the second relative throughput is multiplied by the first relative throughput and then by the memory ratio increased by one, then the first relative throughput and the product of the memory ratio and the second relative throughput are subtracted from the resulting multiplied value.

17. The method of claim 11, wherein the first relative throughput and the second relative throughput are normalized to a third relative throughput, which is a relative throughput when the entire dataset is spilled onto a local disk on the server computing device.

18. The method of claim 11, wherein the server network design is rendered to show a reduction in a total number of server computing devices as a consequence of integrating heterogeneous memory in accordance with the memory ratio, the first relative throughput, and the second relative throughput.

19. The method of claim 11, wherein a user interface is provided to receive the user input of the parameters; and the user interface is configured to display different configuration scenarios side-by-side to allow a user to view and compare effects on the data throughput performance of varying the memory ratio, the first relative throughput, and the second relative throughput.

20. A computing system for modeling a deployment of heterogeneous memory on a server network, the system comprising:

processing circuitry and memory storing instructions which are executed by the processing circuitry to:

receive a user input of parameters including a memory ratio of local memory to heterogeneous memory in each server computing device, a first relative throughput when an entire dataset is in local memory on a server computing device, and a second relative throughput when the entire dataset is in heterogeneous memory on the server computing device;

based on the parameters, determine a server ratio of a number of server computing devices, each server computing device executing data-processing workloads, in an enhanced cluster with heterogeneous memory to a number of server computing devices in a baseline cluster without heterogeneous memory, wherein the enhanced cluster and the baseline cluster deliver equivalent data throughput performance for the data-processing workloads;

based on the server ratio and a relative Total Cost of Ownership (TCO) comparing a TCO of an enhanced server computing device equipped with heterogeneous memory relative to a TCO of a baseline server computing device without heterogeneous memory, calculate a TCO savings value indicating a percentage reduction of TCO that is predicted by deploying heterogeneous memory in the server computing devices in accordance with the inputted parameters; and output the TCO savings value and the server ratio, wherein the local memory is local DRAM; and the heterogeneous memory is Compute Express Link (CXL)-attached DRAM.

* * * * *